United States Patent Office 3,039,292
Patented June 19, 1962

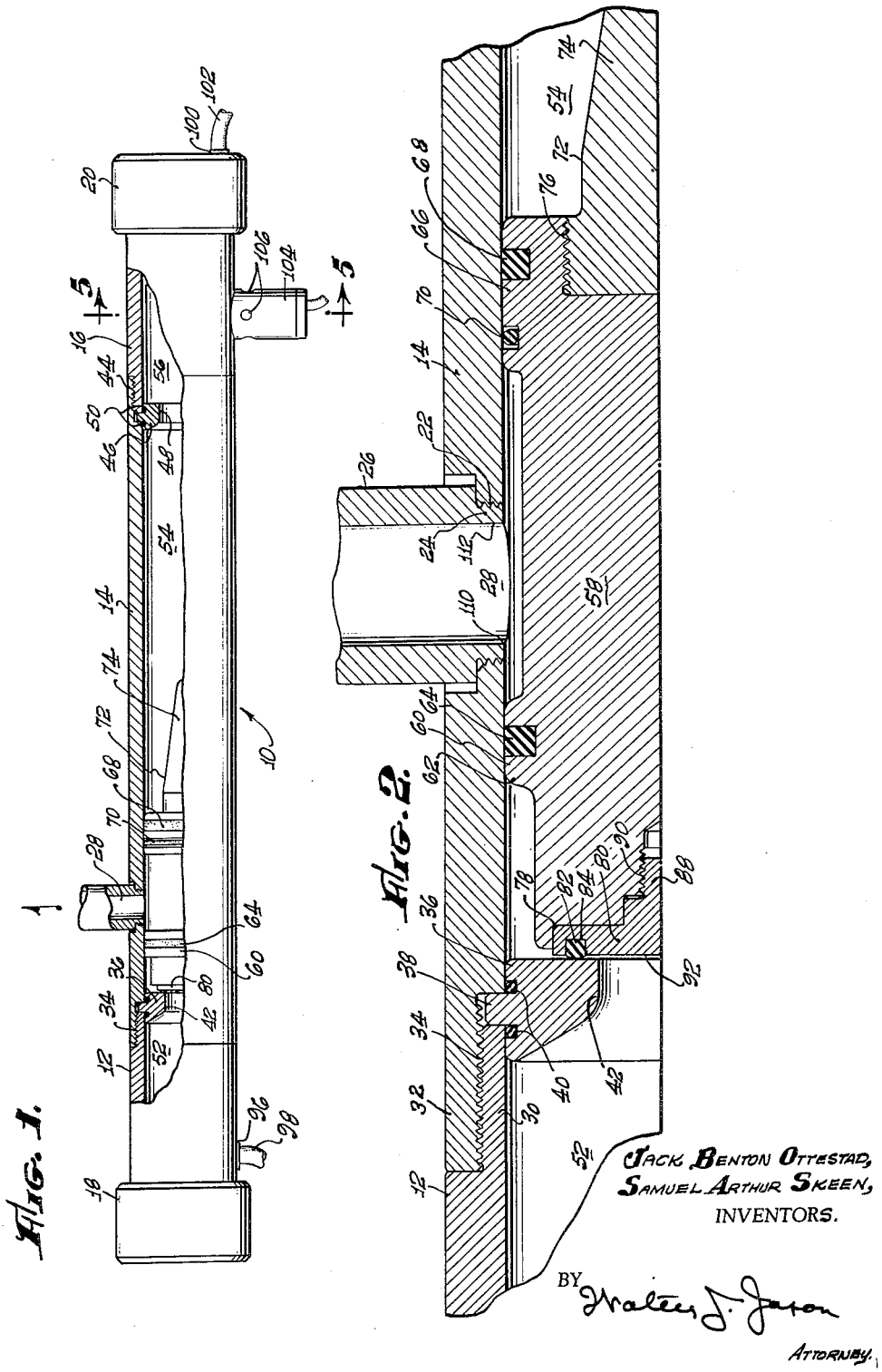

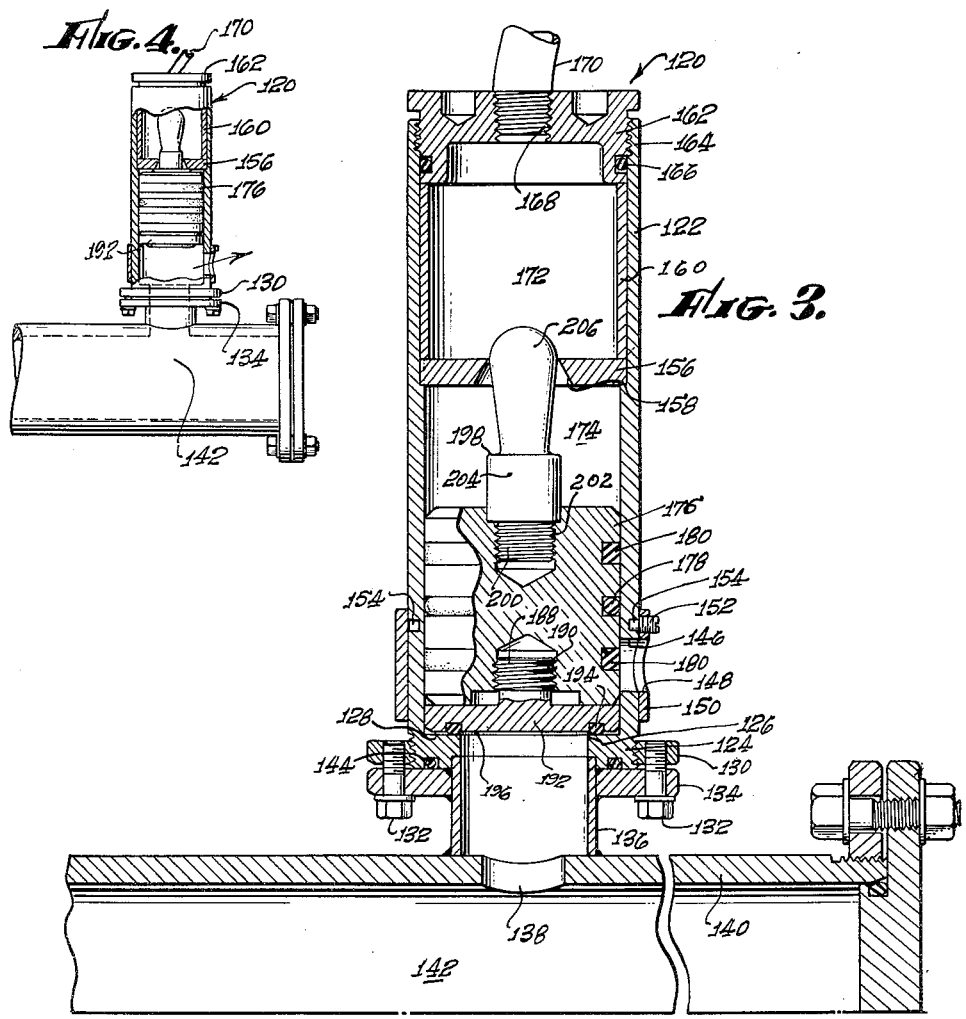

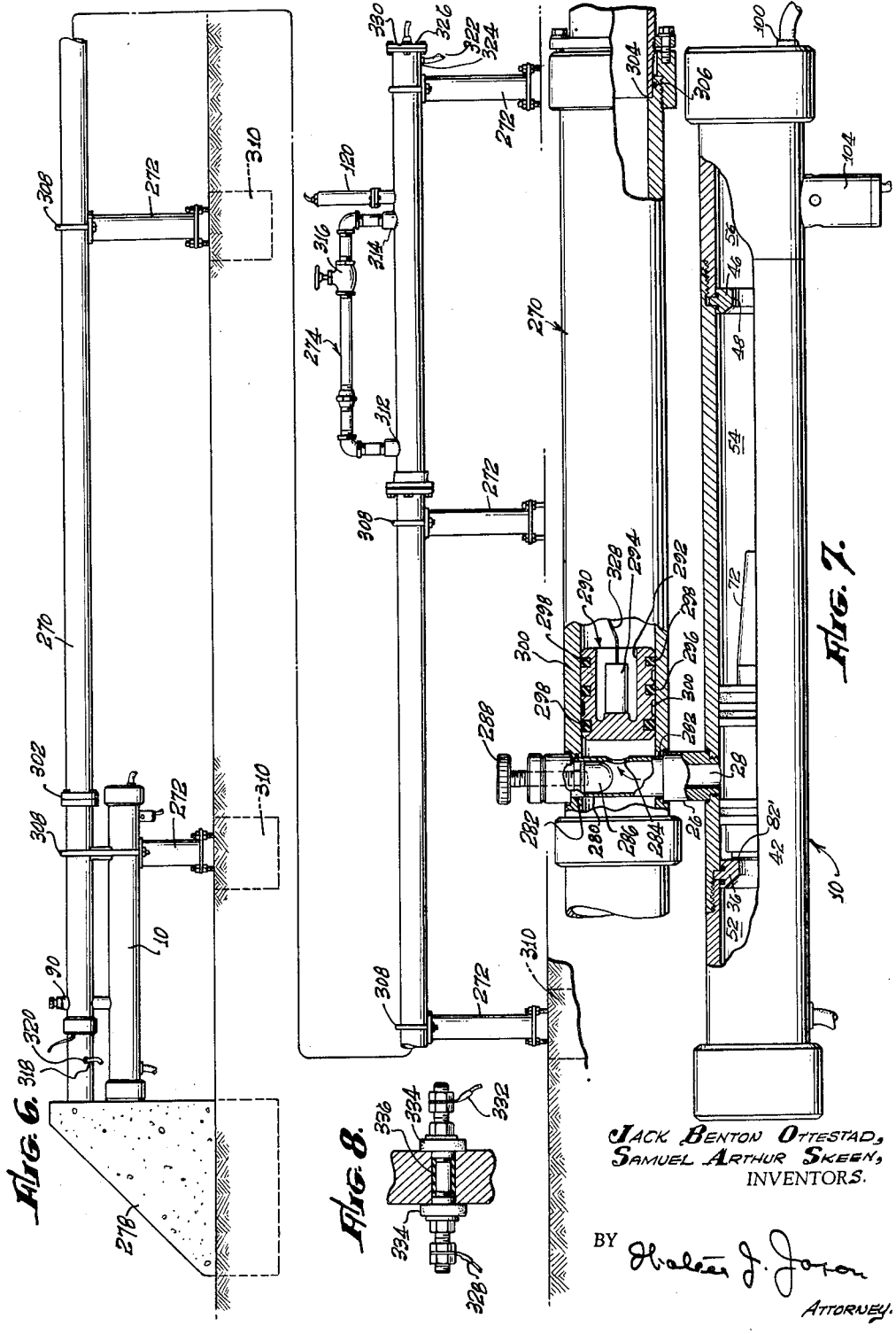

3,039,292
APPARATUS FOR CONTROLLED RELEASE OF
PRESSURIZED FLUID
Jack B. Ottestad, Claremont, and Samuel A. Skeen, West Covina, Calif., assignors to General Dynamics Corporation, San Diego, Calif., a corporation of Delaware
Filed Aug. 9, 1957, Ser. No. 677,279
29 Claims. (Cl. 73—12)

This invention relates generally to apparatus for the release of stored energy; more particularly, it relates to apparatus for controlled rapid release of pressurized fluid.

Heretofore, various devices and methods have been devised to solve the problem of controlling the rapid release of energy. Among these devices are shear pins, frangible diaphragms, rapid-acting valves, burning gases, and explosives. Each of these devices has particular disadvantages and shortcomings which preclude it from becoming a fully adequate solution to the problem. Those versed in the art are familiar with these shortcomings and disadvantages, typical among them being relatively low speed of energy release, poor control of the output pressure-time relation, and difficulty in accurately predetermining release pressure. Frangible diaphragms, shear-pin triggering mechanisms, and devices utilizing rapid-acting valves do not provide accurate control of the energy level of the output. Further, such devices are relatively costly, require special installation, and require considerable maintenance.

A conventional means for effecting rapid release of fluid at selected pressures has been the utilization of frangible diaphragms. Such a diaphragm is commonly made of metal such as aluminum and is ruptured when the pressure upon it increases to a predetermined value. As is known in the art, accurate predetermination of the burst pressure of such a diaphragm is most difficult, this pressure commonly varying widely among substantially identical diaphragms. This precludes effective control of energy release. Even the provision of special indentations on identical diaphragms has failed to provide needed uniformity of energy release wave forms and accurate predetermination of burst pressure.

Rapid-acting valves of the prior art for rapid release of fluid pressure inherently produce a relatively gradual energy release, because there is necessarily a time interval during which the geometric configuration of the opening presented for fluid flow is altered during its enlargement. For example, a butterfly valve presents two progressively enlarging crescents to fluid flow.

It is, therefore, an object of the present invention to alleviate the foregoing disadvantages of the prior art by providing novel apparatus for the very rapid controlled release of stored energy.

It is an object of this invention to provide a new and improved device for the substantially instantaneous release of stored energy.

An object of the present invention is to provide novel means for releasing pressure controllably and more rapidly than devices heretofore known.

It is an object of this invention to provide apparatus for producing a controlled pressure-time pattern.

Another object of the present invention is the provision of novel apparatus for use in the rapid application of power.

It is another object of this invention to provide a novel valve for relieving pressure above a predetermined value.

Another object is the provision of a novel valve for regulating pressure between predetermined values.

A further object of the present invention is to provide apparatus for impelling a projectile by fluid pressure.

It is a further object to provide novel testing apparatus for simulating the effects of firing upon a projectile.

Other objects and features of the present invention, as well as many advantages thereof, will become apparent to those skilled in the art from a consideration of the following description, the appended claims, and the accompanying drawings, in which:

FIGURE 1 is an elevational view partially in section, showing a preferred embodiment of the present invention;

FIGURE 2 is an elevational sectional view, showing a portion of the apparatus of FIGURE 1 on an enlarged scale;

FIGURE 3 is an elevational sectional view, showing details of a second preferred embodiment of the present invention;

FIGURE 4 is an elevational view, partially in section, showing the device of FIGURE 3 on a reduced scale, with certain elements in different geometric relation;

FIGURE 5 is a sectional view taken at line 5—5 of FIGURE 1, showing another embodiment of the present invention;

FIGURE 6 is an elevational view of an apparatus utilizing features of the present invention;

FIGURE 7 is an elevational view, partially in section, showing a portion of the apparatus of FIGURE 6 on an enlarged scale; and FIGURE 8 is an enlarged view, partially in section, showing details of an electrical connection forming a part of the apparatus of FIGURE 6.

Referring to the drawings, and particularly to FIGURES 1 and 2, there is shown a preferred embodiment of the present invention. This embodiment is adapted for very rapid controlled release of pressure into an outlet for utilization. An elongated cylindrical housing 10 is composed of three cylindrical sections 12, 14 and 16, and is sealed at its ends by the end caps 18 and 20 which are threaded onto sections 12 and 16, respectively, and are provided with fluid seals (not shown). Cylindrical section 14 is provided with a threaded opening 22 adapted to receive a threaded end portion 24 of an outlet connection 26 to provide an outlet opening 28. Cylindrical sections 12 and 14 are interconnected by engagement of their respective threaded end portions 30 and 32 at 34, as shown. These mating ends are adapted to secure a wall member or orifice plate 36 by clamping a flange portion 38 between them. A resilient annular seal 40 is disposed in an appropriate peripheral groove in the wall member on each side of flange portion 38 to provide pressure sealing. An orifice 42 is provided in the wall member for a purpose discussed hereinbelow.

Cylindrical section 16 is connected to section 14 by threaded engagement at 44, in the same manner as sections 12 and 14 are interconnected, and clamp a plate 46 in the manner in which wall member 36 is secured. Plate 46 has an aperture 48 and has annular grooves to accommodate resilient annular sealing devices 50, which are similar in structure and purpose to seals 40.

From the foregoing description, it will be understood that cylinder 10 may be considered as divided into chambers 52, 54 and 56 by wall member 36 and plate 46.

A piston 58 is slidably positioned in chamber 54 of cylinder 10. The piston is provided with a regulating flange 60, a side face 62 of which confronts wall member 36. The purpose of this regulating flange will be understood from discussion hereinbelow. A bearing 64 is provided in an appropriate groove in piston 58 and serves to reduce sliding friction between the piston and cylinder 10. A flange portion 66 is axially spaced from regulating flange 60 on piston 58 and serves to maintain piston alignment. A bearing ring 68, like bearing ring 64, is disposed in an appropriate groove in the flange portion, and an annular resilient sealing device 70 is positioned in a peripheral groove to provide a pressure seal between the flange portion and the cylinder. A deceleration metering pin 72, having a contoured portion 74 is secured to piston 58 by threaded engagement with threaded end opening 76.

Confronting wall member 36 and seated in an appropriate recess 78 is a seal base 80. A circular resilient seal 82 is secured to the base as by bonding in an appropriate groove 84. Seal base 80 is secured to piston 58 as by threaded engagement of a shank portion 88 with a threaded opening 90 in the piston. The seal base has a surface 92 confronting the wall member and orifice 42.

A port 96 and fluid connection 98 interconnect a source of pressure (not shown) with chamber 52. Similarly, a port 100 interconnects chambers 56 and 54 with a source of pressure (not shown) through connection 102. A relief valve or burst valve 104 is provided to relieve pressure in chamber 56 above a predetermined value by rapidly releasing pressure through openings 106. By way of example and not by way of limitation, it may be noted that the relief valve utilized is preferably of the type shown in FIGURE 5 and described hereinbelow.

In the operation of the embodiment described above, pressure is introduced through port 100 into chambers 54 and 56 to urge piston 58 against wall 36. The source of this setting pressure (not shown) is preferably compressed gas such as air or nitrogen. It may be a pressurized liquid or some other pressure source. With the setting pressure ($P_1$) within chamber 54, a force equal to the pressure ($P_1$) times the cross-sectional area ($A_1$) of the piston, as encompassed by resilient seal 70, compresses circular resilient seal 82 against the surface of wall member 36 around orifice 42. A positive pressure seal is thereby effected which remains positive despite incremental displacement of the piston, and which isolates chamber 52 from chamber 54.

A pressure ($P_2$) is provided in chamber 52 through port 98 to exert force on the piston opposing and balancing the force applied by the pressure ($P_1$) in chamber 54, thereby effecting a balanced thrust condition on the piston. Because pressure ($P_2$) acts only upon the area ($A_2$) of surface 92 within seal 82, pressure ($P_1$) and pressure ($P_2$) are inversely proportional to the respective piston areas upon which they act, in order to obtain this balanced thrust condition.

The pressure in chamber 52 is then increased by a triggering pressure differential, which unbalances the forces acting upon the piston and thereby causes a small rapid movement of the piston from wall member 36. Circular resilient seal 82 maintains a positive pressure seal for a certain increment of this movement. A further incremental movement suddenly and effectively disengages seal 82 to break the pressure sealing between the piston and the wall member. The pressure ($P_2$) in chamber 52 is released substantially instantaneously to act upon the entire cross-sectional area of piston 58, thereby exerting a very great net force upon the piston. The piston is thus impelled from the wall member with correspondingly extremely high acceleration.

The force and acceleration developed upon piston 58 are obviously functions of the pressures ($P_1$ and $P_2$) in chambers 52 and 54, the piston mass, the cross-sectional area ($A_1$) of the piston and the area ($A_2$) of surface 92 encompassed by seal 82. For example, if pressure ($P_1$) in chamber 54 is 200 pounds per square inch, pressure ($P_2$) is 2,000 pounds per square inch, the piston cross-sectional area is 10 square inches, and the area ($A_2$) within the seal is 1 square inch, the piston would be held in equilibrium with two equal 2,000 pound forces acting upon it. Assuming that a pressure of 100 pounds in addition to pressure ($P_2$) is sufficient to disengage the seal in the manner described, the pressure in chamber 52 is increased to 2,100 pounds per square inch. With the pressure seal broken, a net force of 19,000 pounds suddenly acts on the piston, this force being the difference between 21,000 pounds and 2,000 pounds acting oppositely upon cross-sectional area ($A_1$) of the piston. Assuming a piston mass of 10 pounds, the acceleration imparted to the piston is 1900 g's, according to the equation $$F = ma$$

where $F$=force, $m$=mass, and $a$=acceleration.

From the foregoing description, it will be understood that the present invention provides means whereby a small force controls the release of a very great force. It will also be understood that means are provided for producing extremely high acceleration through the use of a relatively moderate energy source.

The very great accelerating force on the piston makes possible an extremely rapid release of pressure into outlet opening 28. Pressure ($P_2$) and the triggering pressure are retained within cylinder 10 by regulating flange 60 until face 62 of this flange passes the leading (left) edge 110 of outlet opening 28, as will become apparent upon examination of FIGURE 2. The pressure is released as face 62 passes the opening, the speed of passing governing the rate of release. Face 62 passes edge 110 with extreme speed. For example, if the piston acceleration of 1900 g's hereinbefore mentioned is assumed, and if it is assumed that flange face 62 is 0.5 feet from edge 110 when the piston is against the wall member 36, then this speed is 175 feet per second, from the equations $$v = at$$
$$s = vt$$

where $v$=velocity, $a$=acceleration, $t$=time, and $s$=distance. Assuming that opening 28 is 0.1 foot wide, the velocity of face 62 as it passes the trailing (right) edge 112 of opening 28 is 190 feet per second, from the above equations.

It will be understood that the velocity and acceleration of the regulating flange as it passes the outlet opening determine the rate and character of the pressure rise in the outlet opening, and that they govern the time interval during which this pressure rise occurs. Therefore, the axial location of face 62 of regulating flange 60 is important in determining the nature and duration of the output pressure increase. With the piston accelerating, this axial location governs the time interval during which face 62 accelerates before passing the respective edges of opening 28, and therefore governs its velocity at the time of passing.

The nature of the output pressure rise is also a function of the configuration of outlet opening 28, the size of this opening and the characteristics of the fluid utilized. These factors may be important in many applications, despite the exertme rapidity and short duration of the pressure rise. With the circular opening shown in FIGURE 2, the pressure rise is somewhat non-linear because the geometric configuration of the opening presented for fluid flow alters as the opening is exposed. A rectangular opening would provide a more linear rise, because the opening presented for flow would enlarge in only one dimension. Optimum configuration is a matter of design for a particular application. The configuration of the opening is not a major problem unless the fluid utilized is capable of rapid passage through the enlarging opening, consistent with the speed of enlargement. It is preferred that a gas, such as nitrogen or air, be used to facilitate rapid action. However, the type of fluid does not constitute a part of the present invention. Many types of fluid and liquids may be utilized. Hydraulic fluid would be effective in some applications.

From the foregoing descripiton, it will be understood that the present invention provides means for the extremely rapid release of stored energy for use, whereby a relatively low force can control the release of a very high pressure. It will be further understood that means are provided for substantially instantaneous energy release and for control of the character, rate, and duration of energy release.

Deceleration control of piston 58 is provided by deceleration metering pin 72 and deceleration aperture 48, which are hereinbefore described. As the piston moves from orifice plate 36, the gas or fluid in chamber 54 undergoes compression. Metering pin 72 cooperates with the aperture to effect a predetermined regulation of the net aperture flow area through which the gas or fluid in chamber 54 is forced by the piston. Deceleration is effected through the development by the gas of predetermined back pressure in chamber 54, as the gas is forced through the net flow area. This net area is varied as a function of piston position by contoured portion 74 of the deceleration metering pin, thereby creating predetermined back pressure variation and effecting controlled deceleration. By utilizing a metering pin of proper contour, a desired deceleration characteristic can be obtained, whereby there is predetermined variation of deceleration as a function of piston position. Although it may be an integral portion of the piston, deceleration metering pin 72 is preferably fabricated as a separate part adapted for threaded engagement with opening 76 in the piston. This construction provides a convenient means for changing pins so that a variety of deceleration wave forms can be produced with a particular apparatus.

Deceleration is completed by the engagement with the aperture of the portion of the metering pin adjacent to the piston. This portion fits closely within the aperture so that fluid is compressed between the piston and plate 46 to develop high deceleration force and to serve as a cushion which prevents forcible striking.

Relief valve or burst valve 104 operates to relieve pressure in chamber 56 above a predetermined value by permitting gas to escape through openings 106 when the pressure exceeds this value. It assists in regulating piston deceleration by governing the maximum back pressure on the piston. It serves the function of preventing damaging rebound of piston 58 against wall member 36 after it has been decelerated. Without valve 104, sufficient pressure to cause such impelling of the piston might be created in chamber 56 by movement of the piston and coaction of deceleration metering pin 72 with orifice 48. The relief valve may be selected from a variety of rapid-acting devices. The valve should operate with extreme rapidity consistent with the speed of operation of the apparatus hereinbefore described, in order to insure against piston rebound. Therefore, it is preferred that a burst valve of the type shown in FIGURE 5 be used, this being another embodiment of the present invention and being described hereinbelow.

Those versed in the art will realize that a number of modifications and different structures may be made without departing from the essential inventive features of the preferred embodiment, hereinbefore described. For example, it will be understood that deceleration control of the piston is not essential to the operation or function of the device for controlled pressure release. It is contemplated that other means may be utilized for stopping or recovering the piston. Also, apparatus can be constructed for deceleration control alone.

In FIGURES 3 and 4 the present invention is shown in a modified form which is adapted to be utilized as a rapid-acting valve for regulating pressure between predetermined values. Regulator valve or relief valve 120 is shown as including a cylindrical housing 122 which has an end wall portion 124 with an orifice 126 and an inner surface 128. The housing is threaded at its end for engagement with a retaining ring 130 which is detachably mounted as by bolts 132 to a flange 134. Flange 134 is secured as by welding to a mounting tube 136, the tube being similarly secured about an aperture 138 in a wall 140 of a chamber 142 containing pressure to be regulated. Annular resilient seal 144 is disposed in a circular groove in end wall portion 124 to provide a pressure seal.

In the housing near end wall portion 124 there is provided a circular outlet opening 146 which is adapted to register with a corresponding opening 148 in an adjustment collar 150. The collar is attached to the housing by engagement of a set screw 152 with a peripheral groove 154, these providing convenient means for loosening the collar to permit its rotation for partially covering outlet 146. Selective adjustability of the opening is thus provided, for a purpose which will be understood from description hereinafter. A plate 156 with an aperture 158 is seated against a shoulder defined in the interior of the cylindrical housing, as shown, and is secured by a sleeve 160, which is retained by a cap 162. Cap 162 is secured to housing 122 by engagement of its peripheral threads with an internally threaded end portion 164 of the housing. A resilient annular seal 166 is disposed in a peripheral groove in the cap to provide a pressure sealing. A port 168 and a fluid coupling 170 interconnect a source of pressure (not shown) with the valve interior.

From the foregoing description, it will be understood that there are provided means for mounting valve 120 to a chamber containing pressure to be regulated and for communicating said pressure between the chamber and the valve. It will be further understood that the valve interior is divided into pressure chambers 172 and 174 by plate 156.

A free piston 176 is slidably positioned in cylindrical housing 122 and is preferably constructed of a light metal such as aluminum to minimize its mass. An annular resilient sealing device 178 is disposed in an appropriate peripheral groove in the piston to provide a pressure seal between the cylinder and the piston. Disposed in appropriate annular grooves on either side of the sealing device are plastic bearing rings 180, which serve to reduce sliding friction with the cylinder wall. Shank portion 188 threadedly engages threaded opening 190 to secure a seal base 192 to the piston. A resilient circular seal 194 is mounted in seal base 192, as seal 82 of FIGURE 2 is mounted in base 80, and is adapted to engage surface 128 of end wall portion 124. Surface 196 of the seal base confronts orifice 126, as shown.

A deceleration metering pin 198 is secured to the piston at the end opposite from seal base 192 by threaded engagement of a threaded shank portion 200 with opening 202. The metering pin has a cylindrical section 204 and a contoured portion 206 which are adapted to coact with aperture 158, as hereinafter explained.

The operation of the regulating or relief valve shown in FIGURES 3 and 4 is generally similar to that hereinbefore described relative to the embodiment of the present invention shown in FIGURES 1 and 2. It is the purpose of valve 120 to regulate pressure in chamber 142 between predetermined values.

A setting pressure ($P_1$) is introduced through port 168 into chambers 172 and 174 of the valve and acts upon the cross-sectional area of piston 176, as defined by annular seal 178, to compress seal 194 against surface 128 of end wall portion 124 of housing 122, thereby effecting a pressure seal. This force is balanced by the greater pressure ($P_2$) in chamber 142 acting upon the smaller area of surface 196 encompassed by seal 194, and piston equilibrium is thus established.

Upon an increase in the pressure in chamber 142 to a higher predetermined value which is sufficient to disengage seal 194, piston 176 is subjected to extremely high acceleration and moves with extreme speed from orifice 126. The method by which this is effected is described hereinbefore in connection with the embodiment shown in FIGURE 2. The piston uncovers opening 148 substantially instantaneously, thus releasing the pressure. Upon decrease of the regulated pressure being regulated to a lower predetermined value, this setting pressure in chamber 174 reseats the piston and seal 194 to reestablish the pressure seal at orifice 126. The manner of effecting this reseating is more fully described hereinafter.

Deceleration metering pin 198 and orifice 158 in orifice plate 156 cooperate to decelerate the piston in the same general manner as deceleration metering pin 72 and orifice 48 of FIGURE 1 coact. Metering pin 198 is contoured to produce a deceleration pattern whereby piston 176 moves rapidly until opening 148 is exposed, and then slows rapidly to a stop.

Contoured portion 206 permits relatively free flow through aperture 158 so that relatively low deceleration forces act on the piston. After the piston exposes opening 146, cylindrical section 204 engages the aperture and greatly restricts flow therethrough. Gas is compressed in chamber 174 between plate 156 and the piston to effect rapid deceleration. Cylindrical section 204 permits fluid to pass or leak through the aperture in chamber 172 rapidly enough to prevent the high compression pressure in chamber 174 from prematurely reseating the piston against surface 128. The pressure is thus substantially equalized between chambers 174 and 172. The setting pressure ($P_1$) (hereinbefore mentioned) therefore is allowed to act upon the cross-sectional area of the piston. The force produced by the setting pressure is opposed by the action of the pressure being regulated upon the cross-sectional area of the piston. When this regulated pressure drops to the predetermined lower value, the setting pressure ($P_1$) urges seal 194 against surface 128 to re-establish pressure sealing.

It becomes apparent that the ratio of the predetermined lower pressure to the predetermined higher pressure is governed by the ratio of the surface area within seal 194 to the cross-sectional area of the piston. The areas encompassed by seal 194 may readily be altered by replacing removable seal base 192 with a base having a seal 194 of different size. The setting pressure may obviously be altered in accordance with the predetermined higher value of the pressure to be regulated.

The size of the outlet opening is adjustable by means of adjustable collar 150 and set screw 152, to provide means for predetermining the rate of release of fluid through the exposed opening. By properly correlating the opening adjustment with the setting pressure and with a predetermined value of the regulated pressure, the valve may be so operated that it is continuously open, the piston being held by the predetermined pressure in a position where it partially covers the opening. Piston movements in accordance with variations in the regulated pressure then vary the opening size to effect pressure regulation by regulating passage of fluid.

From the foregoing description, it will be understood that there is provided a regulating valve or relief valve utilizing certain features of the present invention, for regulating pressure within predetermined values. It will also be understood that this valve is capable of very rapid operation and is adaptable to accommodate various pressures to be regulated.

In FIGURE 5 is shown another embodiment of the present invention, this embodiment being a relief or burst valve. Burst valve 104 is adapted for rapid release of pressure above a predetermined value.

A cylindrical housing 212 is secured to a wall 214 of a pressure chamber 216 by threaded engagement of a threaded end portion 218 with a threaded opening 220 in the wall. A wall portion 222 of the housing has an inner surface 224 disposed about orifice 226 which communicates with the pressure chamber. Outlet openings 228 are provided in the housing near the wall portion. A cap member 230 is attached to the housing by threaded engagement with an internally threaded end portion 232 and has a cylindrical aperture 234. A port 236 and a fluid connection 238 interconnect the valve interior with a source of pressure (not shown).

A free piston 240 is slidably mounted in cylindrical housing 212 and carries in a peripheral groove an annular resilient sealing device 242 to constitute a pressure seal between the cylinder and the piston. A seal base 244 has a resilient circular seal 246 mounted therein, these elements being similar to seal base 80 and 82, which are hereinbefore described in connection with the embodiment shown in FIGURE 2. The seal base is secured to the piston by engagement of threaded portion 248 with an opening 250. A pressure seal between the seal base and the piston is provided by an annular seal 252 in a space defined between these parts. A deceleration metering pin 254 is secured to the end of the piston opposite seal base 244 by threaded engagement of a threaded shank portion 256 with an opening 258. The metering pin is axially divided into a cylindrical section 260, a neck section 262, and a head section 264, the cylindrical and head sections being adapted to fit closely within aperture 234. Head section 264 carries a resilient annular pressure seal 266 in an appropriate peripheral groove.

The operation of the burst valve of FIGURE 5 is similar in part to that of the embodiment shown in FIGURE 3 and hereinbefore described. In the manner hereinbefore described in connection with other embodiments of this invention, pressure introduced through port 236 acts upon the cross-sectional area of piston 240 to seat the piston, and is balanced by the action of the pressure in chamber 216 upon the piston area within seal 246. Upon an increase in the pressure in chamber 216 to a predetermined value, piston 240 moves rapidly from orifice 226 under very high acceleration, this being effected as hereinbefore described for the embodiment of FIGURE 2. Outlet openings 228 are uncovered and pressure is relieved.

Deceleration metering pin 254 cooperates with aperture 234 in cap 230 to effect deceleration of the piston, and to relieve pressure in the valve interior. As the trailing edge of the piston fully uncovers openings 228, resilient seal 266 passes the outer edge of aperture 234. The valve interior is then in communication with the exterior atmosphere and remains in communication until cylindrical section 260 engages the inner edge of the aperture. This prevents too high a compression within the valve by the action of the piston, which might cause the piston to rebound after its deceleration and thereby prematurely reseat itself against orifice 226 or forcibly strike wall portion 222. After cylindrical section 260 engages aperture 234, compression of fluid between the piston and cap 230 effects rapid deceleration of the piston, while preventing it from forcibly striking cap 230.

From the foregoing description, it will be understood that there is provided a rapid acting relief valve which is readily adaptable for use with different pressures.

In FIGURES 6 and 7 is shown an apparatus utilizing certain features of the present invention, for simulating the effects of the firing of a projectile such as a mortar shell, upon a component in the projectile. The apparatus, as shown in FIGURE 6, generally comprises an elongated barrel which rests upon appropriate supports 272 and which has attached near its muzzle end a regulating valve 120 (hereinbefore shown and described) and a by-pass piping system 274. At the breech end of the barrel is connected the pressure release system shown in FIGURE 1 and hereinbefore described (enclosed in housing 10). As shown, a reaction pier 278 is imbedded in the ground at the left end of the barrel.

In FIGURE 7 the pressure release device of FIGURES 1 and 2 is shown connected to the barrel by a connector tube 280, a pressure seal between the tube and barrel being insured by annular seals 282 in appropriate grooves in the barrel. An outlet opening 284 in the tube provides communication with the interior of the barrel. A regulating plunger 286 in the tube provides means for adjusting the size of this opening by means of a knob 288.

A projectile is slidably positioned within barrel 270 and has an opening 292 which is adapted to receive a component 294 to be tested. An annular resilient sealing device 296 in an appropriate peripheral groove on the projectile provides a pressure seal between the projectile and the barrel. Also disposed in appropriate peripheral grooves on the projectile are bearing rings 298. Grooves 300 in the projectile reduce sliding friction. As shown, cylinder 10 and barrel 270 at their left ends abut concrete reaction pier 278, the latter being adapted to receive shock loading from these members.

The barrel is constructed in sections joined by conventional bolted flanges 302, in the manner shown in detail in FIGURE 7. A continuous smooth internal bore is provided by smooth joints as at 304, and a plurality of resilient annular seals 306 insure against pressure leakage from the barrel. The barrel is supported along its length by supports 272, to which it is secured as by U-bolts 308, the supports being mounted in concrete foundations 310. By-pass piping system 274 is positioned near valve 120, as shown, and is connected at two axially-spaced ports 312 and 314 to provide fluid communication therebetween. This piping system is of conventional construction and is provided with a control valve 316 to provide means for adjusting the flow and pressure between the ports, for a purpose hereinafter mentioned. A fluid coupling 318 at a port 320 interconnects the interior of the barrel with a source of pressure (not shown). Similarly, at the muzzle end of the barrel, a fluid coupling 332 and a port 324 interconnect the interior of the barrel with a source of pressure (not shown). The barrel is sealed at its right end by a cap member 326.

In the particular embodiment shown, an electrical component is to be tested and a signal is to be conveyed therefrom to instrumentation outside the barrel. An electrical wire 328 is connected to the component 294 and is pushed ahead of the piston as it moves along the barrel. As shown in FIGURE 6, an hermetic electrical connection 330 in cap 326 interconnects wire 328 with an electrical conductor 332 exterior of the barrel. This connection is conventional and utilizes insulators 334 for electrical insulation and a resilient member 336 to provide pressure sealing.

In the operation of the apparatus shown in FIGURES 6 and 7, projectile 290 is positioned at the left end of barrel 270, as shown. The component 294 to be tested is mounted in the projectile. The component may be examined after firing or instrumentation may be associateh with it to measure effects or performance during simulated firing. Electrical wires 328 for this purpose interconnect component 294 with instrumentation outside the barrel through connector 330 (described above).

By means of fluid coupling 322 gas under pressure is introduced into barrel 220 to provide a predetermined pressure. Connection 318 at the breech end of the barrel is opened to relieve pressure on the breech side of the piston, and is then closed before firing. Projectile 290 is held stationary before firing by the predetermined pressure and by stop means (not shown). This predetermined initial pressure is provided within the barrel to control the deceleration of the piston to reduce its travel in conformity with the length of the particular barrel utilized, as is discussed further hereinbelow.

By means of the pressure releasing apparatus shown in FIGURES 1 and 2, and hereinbefore described, gas under a predetermined high pressure is released through outlet connection 28 with extreme rapidity and is impressed upon the left face of projectile 290. The precise rate at which the pressure increases against the piston, to simulate an explosive detonation, is controlled by flange portion 60 of piston 58 and opening 28, in the manner hereinbefore described, and by adjustment of outlet opening 284 by knob 288. An extremely high rate of pressure increase against the left face of projectile 290 having been effected to exert very great force against it, the projectile is impelled rightward in the barrel at an extremely high acceleration. The recoil of barrel 270 from this firing is compensated by concrete reaction pier 278 which is imbedded in the ground. The projectile accelerates for a time, until the accelerating force diminishes. Since the explosive firing is being simulated, the high gas pressure is applied behind the piston sufficiently rapidly to maintain the acceleration. In the firing of a shell, the explosive charge acts upon the shell only a short time. In this application, because of the conditions being simulated, it is desired that a relatively constant decelerating force act upon projectile 290, and that the projectile not be slowed and stopped as rapidly as would be the case if gas were compressed in the barrel ahead of the piston by its movement. Therefore, regulator valve or burst flow valve 120 is provided at the muzzle end of the barrel to regulate the pressure ahead of the projectile between predetermined values. A relatively constant decelerating force on the piston is thus effected. The prevention of compression ahead of the projectile also insures against its rebounding from the muzzle end of barrel 270 under the spring-like action of gas compressed at that end of the barrel. The construction of burst flow valve 120 and its operation in regulating pressure between limits are hereinbefore described in connection with the embodiment of the present invention shown in FIGURE 3.

By-pass piping system 274 is provided to equalize the pressures on both sides of projectile 290 after it passes port 312, and serves to substantially stop the projectile by equalizing the forces upon it. In the particular embodiment under discussion, the pressure to the left of the piston drops below that to the right, as the piston approaches the muzzle end of the barrel. This is caused by the particular combination of barrel length, firing pressure, barrel diameters, and pressure maintained ahead of the projectile. Therefore, despite the operation of rapid-acting valve 120, a moderate compression at the muzzle end of the barrel might cause the piston to rebound, if by-pass piping system were not provided. After projectile 290 passes port 312, the pressure to the right of the projectile is released through port 314 and by-pass system 274 to port 312, so that the pressures before and behind the piston are substantially equalized. Therefore, there is substantially no net force impelling it. The projectile is therefore substantially stopped and friction between the barrel and the piston, together with compression of gas by the projectile to the right of valve 120 completely stops it. It will be understood that by-pass piping system 274 may also be utilized to slow or stop the progress of a projectile by releasing a higher pressure behind the piston to act ahead of it. From the foregoing description it will be understood that rapid-acting pressure release devices according to the present invention may be utilized to simulate the firing of projectiles. Although specific embodiments of the present invention have been described and illustrated in detail, it is to be clearly understood that the same are by way of illustration and example only; it is to be understood that the invention is not limited thereto, as many variations will be readily apparent to those versed in the art and the invention is to be given its broadest possible interpretation within the terms of the appended claims.

We claim:

1. Apparatus for releasing pressurized fluid comprising housing means, a wall with an orifice in said housing means, a piston member positioned within said housing means, and having a surface confronting said wall, means providing a setting pressure for exerting a force on said piston member urging said piston toward said wall to cover said orifice, means for effecting a pressure seal between said piston and said wall, means for applying fluid pressure on an area of said surface covering said orifice to overbalance said force and disengage said fluid pressure seal to allow said fluid pressure to act suddenly upon an increased area of said surface to rapidly accelerate said piston, and means defining an outlet for releasing said fluid pressure upon movement of said piston in response to said fluid pressure, said outlet means being positioned to be opened by the piston upon said movement.

2. Apparatus for releasing pressurized fluid comprising housing means, a wall with an orifice in said housing means, a piston member positioned within said housing and having a surface confronting said wall, means providing a setting pressure for exerting force on said piston member urging said piston toward said wall to cover said orifice, a resilient sealing element positioned between said piston and said wall for effecting a pressure seal therebetween about said orifice, means for establishing a fluid pressure acting on an area of said surface covering said orifice to overbalance said force and suddenly expose an increased area of said surface to said fluid pressure to rapidly accelerate said piston, and means defining an outlet for releasing said fluid pressure upon movement of said piston in response to said fluid pressure, said outlet means being positioned to be opened by the piston upon said movement.

3. Apparatus for controlled release of pressurized fluid comprising housing means, a wall with an orifice in said housing means, a piston member positioned within said housing and having a surface confronting said wall, a resilient seal carried by said surface, means providing a setting pressure for exerting force on said piston to establish a pressure seal between said surface and said wall and to cover said orifice, means for exerting fluid pressure upon an area of said surface within said seal to move said surface out of sealing relationship with said wall to allow said fluid pressure to act suddenly upon the entire area of said surface to rapidly accelerate said piston, and means defining an outlet opening in said housing on the piston side of said wall for releasing said fluid pressure upon movement of said piston in response to said fluid pressure.

4. Apparatus for releasing stored energy comprising housing means, a wall with an orifice in said housing means, means defining an aperture within said housing means, a piston member positioned within said housing between said wall and said aperture, said piston having a surface confronting said wall, means providing a setting pressure for exerting force on said piston member urging said piston toward said wall to cover said orifice, a resilient sealing element positioned between said piston and said wall for effecting a pressure seal therebetween about said orifice, means for establishing a fluid pressure acting on an area of said surface covering said orifice to overbalance said force and suddenly exposed an increased area of said surface to said fluid pressure to rapidly accelerate said piston, outlet means positioned to be opened by the piston for releasing said fluid pressure upon movement of said piston in response to said fluid pressure, and means carried by said piston for regulating fluid flow through said aperture to develop predetermined decelerating forces on said piston.

5. Apparatus for releasing stored energy comprising a cylinder having a wall with an orifice, said wall defining first and second pressure chambers, a piston member positioned within said first chamber and having a surface confronting said wall, means for establishing a first pressure in said first chamber for producing a force urging said piston toward said wall to cover said orifice, a resilient sealing element positioned between said piston and said wall for effecting a pressure seal therebetween about said orifice, means for establishing in said second chamber a second pressure acting on an area of said surface covering said orifice to overbalance said force and suddenly expose an increased area of said surface to said second pressure to rapidly accelerate said piston, means defining an opening in said first chamber for releasing said second pressure upon movement of said piston by said second pressure, means defining an aperture within said first chamber, and a metering member on said piston for engaging said aperture to regulate flow therethrough, said member being contoured to produce predetermined variation in decelerating pressure acting on said piston.

6. Apparatus for releasing stored energy comprising housing means, having a wall with an orifice and defining first and second pressure chambers, a piston member positioned within said first chamber and having a surface confronting said wall, means providing a setting pressure for exerting force on said piston member urging said piston toward said wall to cover said orifice, a resilient sealing element positioned between said piston and said wall for effecting a pressure seal therebetween about said orifice, means for establishing in said second chamber a fluid pressure acting on an area of said surface covering said orifice to overbalance said force and suddenly expose an increased area of said surface to said fluid pressure to rapidly accelerate said piston, and means defining an opening in said first chamber, said opening being exposed to said fluid pressure by the rim of said piston axially nearest said surface upon movement of the piston in response to said fluid pressure.

7. Apparatus for releasing pressurized fluid comprising a cylinder having a wall defining an orifice, a piston member positioned within said cylinder and having a surface confronting said wall, a flange on said piston confronting said wall and engaging said cylinder, means for exerting force on said piston member urging said piston toward said wall to cover said orifice, a resilient pressure seal surrounding said orifice and disposed between said piston surface and said wall for effecting a pressure seal therebetween, means for applying fluid pressure on an area of said surface within said seal to overbalance said force and allow said fluid pressure to act upon an increased area of said surface to develop an increased force against said surface of said piston, and means defining an opening in said cylinder on the piston side of said wall, said opening being exposed to said fluid pressure by said flange upon movement of said piston by said increased force.

8. Apparatus for controlled release of pressurized fluid, comprising a cylinder having a wall with an orifice and defining first and second pressure chambers, a piston member positioned within said first chamber and having a surface confronting said orifice, a resilient seal carried by said surface, a flange on said piston axially spaced from said surface, said flange engaging said cylinder and having a face confronting said wall, means for exerting a force on said piston to establish a pressure seal between said surface and said wall and to cover said orifice, means for exerting fluid pressure in said second chamber upon an area of said surface within said seal to move said surface out of sealing relationship with said wall to allow said fluid pressure to act upon the entire area of said surface, and means defining an outlet opening in said first chamber, said fluid pressure being released through said opening by said flange face upon movement of said piston in response to said fluid pressure.

9. A device for controlled release of pressurized fluid comprising a cylindrical housing, a wall in said housing, said wall having an orifice and defining first and second pressure chambers, a piston member positioned within said first chamber and having a surface confronting said wall, a regulating flange on said piston axially spaced from said surface, said flange engaging said cylindrical housing and having a face confronting said wall, means for establishing a first pressure in said first chamber for exerting a force urging said piston against said wall to cover said orifice, a resilient pressure seal surrounding said orifice and disposed between said piston surface and said wall for effecting a pressure seal therebetween, means for establishing a second pressure in said second chamber, said second pressure acting on an area of said surface within said seal to overbalance said force and allow said second pressure to act upon an increased area of said surface, and means defining an opening in said first chamber, said second pressure being released through said opening by said flange face upon movement of said piston by said second pressure.

10. Apparatus for controlled release of pressurized fluid, comprising a cylinder having a wall defining an orifice, a piston positioned within said cylinder and having a surface confronting said wall, a flange on said piston confronting said wall and engaging said cylinder, means for exerting force on said piston member urging said piston toward said wall to cover said orifice, a resilient pressure seal surrounding said orifice and disposed between said piston surface and said wall for effecting a pressure seal therebetween, means for applying pressure on an area of said surface within said seal to overbalance said force and allow said pressure to act upon an increased area of said surface, means defining an opening in said cylinder on the piston side of said wall, said pressure being released through said opening by said flange upon movement of said piston by said pressure, means defining a restricted passage within said cylinder, and means carried by said piston for regulating fluid flow through said passage to develop predetermined decelerating forces on said piston.

11. A device for controlled release of pressurized fluid, comprising a cylindrical housing, a wall in said housing, said wall having an orifice and defining first and second pressure chambers, a piston member positioned within said first chamber and having a surface confronting said wall, a regulating flange on said piston axially spaced from said surface, said flange engaging said cylindrical housing and having a face confronting said wall, means for establishing a first pressure in said first chamber for exerting a force urging said piston against said wall to cover said orifice, a resilient pressure seal surrounding said orifice and disposed between said piston surface and said wall for effecting a pressure seal therebetween, means for establishing a second pressure in said second chamber, said second pressure acting on an area of said surface within said seal to overbalance said force and allow said second pressure to act upon an increased area of said surface, an opening in said first chamber, said second pressure being released through said opening by said flange upon movement of said piston by said second pressure, means defining a restricted passage within said first chamber, and a metering member on said piston for engaging said restricted passage to regulate fluid flow therethrough, said metering member being contoured to produce predetermined variation in decelerating pressure acting on said piston.

12. Apparatus for controlled release of pressurized fluid comprising a cylinder having a wall with an orifice and defining first and second chambers, means defining a restricted passage in said first chamber, a piston member positioned within said first chamber between said wall and said passage, said piston having a surface confronting said wall, a resilient seal carried by said surface, a flange on said piston axially spaced from said surface, said flange engaging said cylinder and having a face confronting said wall, means for exerting a force on said piston to establish a pressure seal between said surface and said wall and to cover said orifice, means for exerting pressure in said second chamber upon an area of said surface within said seal to move said surface out of sealing relationship with said wall to allow said pressure to act upon the entire area of said surface, means defining an outlet opening in said first chamber, said pressure being released through said opening by said flange upon movement of said piston by said pressure, said axial spacing of said flange and the configuration of said opening being selected to predetermine the characteristic of the pressure rise at said opening, and a contoured metering pin carried by said piston for movement into said restricted passage to regulate fluid flow therethrough to develop predetermined variation in decelerating pressure acting on said piston.

13. Apparatus for controlled release of pressurized fluid, comprising a cylinder having a wall with an orifice and defining first and second pressure chambers, a piston member positioned within said first chamber and having a surface confronting said orifice, a resilient seal carried by said surface, a flange on said piston axially spaced from said surface, said flange engaging said cylinder and having a face confronting said wall, means for exerting a force on said piston to establish a pressure seal between said surface and said wall and to cover said orifice, and means for exerting pressure in said second chamber upon an area of said surface within said seal to move said surface out of sealing relationship with said wall to allow said pressure to act upon the entire area of said surface, means defining an outlet opening in said first chamber, said opening being exposed to said pressure by said flange face upon movement of said piston effected by said pressure, means defining a restricted passage within said first chamber, a metering member on said piston for regulating fluid flow through said passage to develop predetermined decelerating forces on said piston, and means for relieving pressure produced in said second chamber by said piston movement.

14. Apparatus for controlled release of pressurized fluid comprising a cylinder having a first wall with a first orifice and defining first and second pressure chambers, a piston member positioned within said first chamber and having a surface confronting said first wall, a resilient seal carried by said surface, means for establishing a first pressure in said first chamber to establish a pressure seal between said surface and said first wall and to cover said first orifice, means for exerting a second pressure upon an area of said surface within said seal to move said surface out of sealing relationship with said first wall to allow said pressure to act upon the entire area of said surface, means defining an outlet opening in said first chamber for releasing said pressure upon movement of said piston member by said pressure, and a valve for rapidly relieving a high pressure produced in said first chamber by said piston movement, said valve including means for providing communication between said valve and said first chamber, a second wall with a second orifice, a piston positioned within said housing and having a surface confronting said second wall, means for exerting force on said piston urging said piston toward said second wall to cover said second orifice, means for effecting a pressure seal between said piston and said second wall, said high pressure acting on an area of said piston surface covering said second orifice to overbalance said force and allow said high pressure to act upon an increased area of said piston surface, and an outlet means for releasing said pressure upon movement of said piston by said pressure.

15. A relief valve comprising means interconnecting said valve with a source of fluid pressure, a wall with an orifice between said source and the interior of said valve, a piston positioned within said valve with a surface confronting said wall, means providing a setting pressure for exerting a force on said piston urging said piston toward said wall to cover said orifice, means for effecting a pressure seal between the piston and the wall about said orifice, a predetermined value of said fluid pressure acting on an area of said surface covering said orifice to overbalance said force to suddenly expose an increased area of said piston to said fluid pressure to rapidly accelerate said piston, and means defining an opening for releasing said fluid pressure upon movement of said piston in response to said fluid pressure, said outlet means being positioned to be opened by the piston upon said movement.

16. A valve for relieving fluid pressure, comprising a housing, means for providing fluid communication between said housing and a source of pressure to be controlled, a wall defining an orifice between said pressure source and the interior of said housing, a piston positioned within said valve with a surface confronting said wall, a resilient sealing element disposed about said orifice between said surface and said wall, means for establishing a setting pressure in said valve for producing a force on said piston to establish a pressure seal between said surface and said wall, a predetermined value of said controlled pressure acting on an area of said surface within said seal to overbalance said force to move said surface out of sealing relationship to suddenly expose an increased area of said controlled surface to said pressure to rapidly accelerate said piston, and means defining an opening in said housing positioned to be opened by the piston for releasing said controlled pressure upon movement of said piston in response to said predetermined value of said controlled pressure.

17. A valve for relieving fluid pressure above a predetermined value, comprising a cylindrical housing, means for providing communication between said housing and a source of pressure being controlled, a wall defining an orifice between said pressure source and the interior of said housing, a piston positioned within said housing with a surface confronting said wall, a resilient seal carried by said surface and adapted to encircle said orifice, fluid pressure means for exerting a setting force on said piston to cover said orifice and establish a pressure seal between said surface and said wall, a predetermined value of said controlled pressure acting on an area of said surface within said seal to overbalance said force and suddenly expose all of said surface to said controlled pressure to rapidly accelerate said piston, and means defining an outlet opening in said housing on the piston side of said wall for releasing said controlled pressure upon movement of said piston in response to said predetermined value of said controlled pressure.

18. A valve for relieving fluid pressure, comprising a housing, means for providing fluid communication between said housing and a source of pressure to be controlled, a wall defining an orifice between said pressure source and the interior of said housing, a piston positioned within said valve with a surface confronting said wall, a resilient sealing element disposed about said orifice between said surface and said wall, means providing a setting pressure for exerting a force on said piston to cover said orifice and establish a pressure seal between said surface and said wall, a predetermined value of said controlled pressure acting on an area of said surface within said seal to overbalance said force to move said surface out of sealing relationship and suddenly expose an increased area of said surface to said controlled pressure to rapidly accelerate said piston, means defining an outlet opening in said housing for releasing said controlled pressure upon movement of said piston in response to said predetermined value of said controlled pressure, means defining an aperture within said housing, and means carried by said piston for regulating fluid flow through said aperture to develop predetermined decelerating forces on said piston.

19. A valve for relieving fluid pressure above a predetermined value, comprising a cylindrical housing, means for providing communication between said housing and a source of pressure being controlled, a wall defining an orifice between said pressure source and the interior of said housing, means defining an aperture within said housing, a piston positioned within said housing between said wall and said aperture, said piston having a surface confronting said wall, a resilient sealing element positioned about said orifice between the surface and the wall, means for establishnig a setting pressure in said housing for exerting a force on said piston to establish a pressure seal between said surface and said wall, a predetermined value of said pressure acting on an area of said surface within said seal to overbalance said force to move said surface out of sealing relationship and suddenly expose an increased area of said surface to said pressure to rapidly accelerate said piston, means defining an opening in said housing for releasing said controlled pressure upon movement of said piston in response to said predetermined pressure, and a metering member on said piston for engaging said aperture to regulate fluid flow therethrough, said member being contoured to produce predetermined variation in decelerating pressure acting on said piston.

20. A valve for regulating pressure between predetermined lower and higher values, comprising a cylindrical housing, means for providing communication between said housing and a source of pressure being controlled, a wall defining an orifice between said pressure source and the interior of said housing, means defining an aperture within said housing separating first and second pressure chambers, a piston positioned in said first chamber and having a surface confronting said wall, a resilient sealing element disposed about said orifice between said surface and said wall, means for establishing a setting pressure in said second chamber to exert a force urging said piston against said wall and exposing an area of said surface within said sealing element to said pressure being controlled, said setting pressure effecting a pressure seal between said surface and said wall when said controlled pressure is below said predetermined value, said predetermined higher pressure acting on said exposed area of said surface to overbalance said force and expose all of said surface to said higher pressure, means defining an opening in said housing, said opening being exposed to said predetermined higher pressure by said piston upon movement thereof in response to said higher pressure, a metering member carried by said piston for engaging said aperture to regulate flow therethrough, a first section of said member, said section being contoured to permit relatively free flow through said aperture until said opening is exposed by the piston, and a second section of said metering member, said second section being adapted to restrict flow through said aperture to produce high decelerating pressure after said opening is exposed, while permitting sufficient flow for rapid pressure equalization between said first and second chambers, said setting pressure acting upon said piston to reestablish said pressure seal between said surface and said wall when said controlled pressure acting upon all of said surface falls to said predetermined lower value.

21. A valve for regulating pressure between predetermined lower and higher values, comprising a cylindrical housing, means for providing communication between said housing and a source of pressure being controlled, a wall defining an orifice between said pressure source and the interior of said housing, means defining an aperture within said housing separating first and second pressure chambers, a piston positioned in said first chamber and having a surface confronting said wall, an annular pressure sealing element between said piston and said housing, a resilient sealing element disposed about said orifice between said surface and said wall, means for establishing a setting pressure in said second chamber, to exert a force urging said piston against said wall and exposing an area of said surface within said sealing element to said pressure being controlled, said pressure effecting a pressure seal between said surface and said wall when said controlled pressure is below said predetermined higher value, said predetermined high pressure acting on said exposed area of said surface to over-balance said force and expose to said higher pressure a cross-section of said piston defined by said sealing element, means defining an opening in said housing, said opening being exposed to said predetermined higher pressure by said piston upon movement thereof in response to said higher pressure, means for selective adjustment of the size of said opening, a metering member carried by said piston for engaging said aperture to regulate flow therethrough, a first section of said member, said section being contoured to permit relatively free flow through said aperture until said opening is exposed by the piston, and a second section of said metering member, said second section being adapted to restrict flow through said aperture to produce high decelerating pressure after said opening is exposed, while permitting sufficient flow for rapid pressure equalization between said first and second chambers, said setting pressure acting upon said piston to reestablish said pressure seal between said surface and said wall when said controlled pressure acting upon said cross-section of said piston falls to said predetermined lower value.

22. A valve for rapidly relieving pressure at a predetermined pressure, comprising a cylindrical housing, a wall defining an orifice between the interior of said housing and a source of pressure being controlled, a piston positioned in said housing and having a surface confronting said wall, a resilient sealing element disposed about said orifice between said surface and said wall, means for establish a setting pressure in said housing to exert a force urging said piston against said wall and exposing an area of said surface within said sealing element to said pressure being controlled, said setting pressure effecting a pressure seal between said surface and said wall, said predetermined pressure acting on said exposed area of said surface to overbalance said force and expose the entire area of said surface to said predetermined pressure, means defining an outlet opening in said housing, said predetermined pressure being released through said opening upon movement of said piston in response to said predetermined pressure, means defining an aperture in said housing, a metering member carried by said piston for regulating flow through said aperture, said member having a head section, a reduced section, and a plug section, and means for effecting pressure sealing between said head section and said aperture to retain said setting pressure for maintaining said pressure seal between said surface and said wall, said reduced section permitting relatively free flow through said aperture after said piston exposes said outlet opening, and said plug section restricting said flow to produce high deceleration pressure after said outlet opening is thus exposed.

23. A valve for the rapid release of pressure comprising a cylindrical housing, a wall defining an orifice between the interior of said housing and a source of pressure being controlled, a piston positioned in said housing and having a surface confronting said wall, a resilient sealing element disposed about said orifice between said surface and said wall, means for establishing a setting pressure in said housing to exert a force urging said piston against said wall and exposing an area of said surface within said sealing element to said pressure being controlled, said setting pressure effecting a pressure seal between said surface and said wall, a predetermined value of said pressure acting on said exposed area of said surface to overbalance said force and expose the entire area of the surface to said predetermined pressure, means defining an outlet opening in said housing, said opening being exposed to said predetermined pressure by said piston upon movement thereof in response to said predetermined pressure, a cap member defining a circular aperture at the end of said housing opposite said wall, and a metering member extending from said piston for engaging said aperture to regulate flow therethrough, said member being axially divided into a head section, a reduced section and a plug section, an annular sealing device carried by said head section for providing pressure sealing to retain said setting pressure within said housing for maintaining said pressure seal between said surface and said wall, said reduced section effecting release of internal pressure from said housing after said piston exposes said outlet opening, and said plug section restricting said flow to produce high deceleration force after said outlet opening is thus exposed.

24. In an apparatus for impelling a projectile by fluid pressure within a barrel, the firing combination comprising housing means, a wall with an orifice in said housing means, a piston member positioned within said housing and having a surface confronting said wall, means for exerting force on said piston member urging said piston toward said wall to cover said orifice, means for effecting a pressure seal between said piston and said wall, means for applying pressure on an area of said surface covering said orifice to overbalance said force and allow said pressure to act upon an increased area of said surface, an opening in said housing means positioned to be uncovered upon movement of said piston in response to said pressure, mean for providing fluid communication between said opening and said barrel, said last means including an aperture communicating with the interior of said barrel.

25. In a device for impelling a projectile by fluid pressure, the firing combination comprising housing means, a wall with an orifice in said housing means, a piston member positioned within said housing and having a surface confronting said wall, means for exerting force on said piston member urging said piston toward said wall to cover said orifice, a resilient sealing element positioned between said piston and said wall for effecting a pressure seal therebetween about said orifice, means for establishing a pressure acting on an area of said surface covering said orifice to overbalance said force and expose an increased area of said surface to said pressure, an opening in said housing means for releasing said pressure upon movement of said piston in response to said pressure, a tubular fluid connection communicating between said opening and said barrel, said connection having an aperture communicating with the interior of the barrel, and a regulating member disposed in said tubular connection for adjusting the size of said aperture to control application of said pressure.

26. Apparatus for impelling a projectile by fluid pressure within a barrel, comprising an elongated barrel having a muzzle end and a breech end, a projectile slidably mounted in said barrel and initially positioned at said breech end, means for rapidly releasing pressurized fluid into said breech end to accelerate said projectile, valve means for regulating pressure in said barrel ahead of said projectile to effect predetermined deceleration thereof, and means for providing external communication between axially spaced ports in said barrel near said muzzle end to decelerate said projectile during its passage between said ports.

27. Apparatus for simulating the effects of firing upon a projectile, comprising a device for rapidly releasing pressurized fluid, said device including housing means, a wall with an orifice in said housing means, a piston member positioned within said housing and having a surface confronting said wall, means for exerting force on said piston member urging said piston toward said wall to cover said orifice, a resilient sealing element positioned between said piston and said wall for effecting a pressure seal therebetween about said orifice, means for establishing a pressure acting on an area of said surface covering said orifice to overbalance said force and expose an increased area of said surface to said pressure, and an outlet means for releasing said pressure upon movement of said piston in response to said pressure; an elongated barrel having a muzzle end and a breech end; means for closing said ends; means for providing fluid communication between said outlet and said breech end of the barrel; a projectile slidably mounted in said barrel, said projectile being accelerated by release of said pressure; and means for regulating pressure in said barrel ahead of said piston to effect predetermined deceleration thereof.

28. Apparatus according to claim 26 and further including a component mounted for testing in said projectile, and an electrical wire interconnecting said component with instrumentation exterior of said barrel through an insulated hermetic connector.

29. Apparatus for impelling a projectile by fluid pressure within a barrel, comprising an elongated barrel having a muzzle end and a breech end; a projectile slidably mounted in said barrel and initially positioned at said breech end; means for rapidly releasing pressurized fluid into said breech end to accelerate said projectile; and a valve near said muzzle end for releasing pressure ahead of said projectile to effect predetermined deceleration thereof, said valve including a wall with an orifice between the interior of said barrel and the interior of said valve, a piston positioned within said valve with a surface confronting said wall, means for exerting a force on said piston urging said piston toward said wall to cover said orifice, means for effecting a pressure seal between the piston and the wall about said orifice, a predetermined value of said pressure acting on an area of said surface covering said orifice to overbalance said force to suddenly expose an increased area of said piston to said pressure to rapidly accelerate the piston from said wall, and means defining an opening for releasing said pressure upon acceleration of said piston in response to said pressure.

References Cited in the file of this patent

UNITED STATES PATENTS

| | | |
|---|---|---|
| 451,210 | Hayden | Apr. 28, 1891 |
| 635,149 | Schreidt | Oct. 17, 1899 |
| 1,071,972 | Wafer | Sept. 2, 1913 |
| 1,258,167 | Vollmann | Mar. 5, 1918 |
| 1,962,549 | Bjorklund | June 12, 1934 |
| 2,490,511 | Courtot | Dec. 6, 1949 |
| 2,537,096 | Shreeve et al. | Jan. 9, 1951 |
| 2,604,777 | Armstrong et al. | July 29, 1952 |
| 2,667,892 | Gentzel | Feb. 2, 1954 |
| 2,880,750 | Amison | Apr. 7, 1959 |
| 2,939,318 | Armi et al. | June 7, 1960 |

OTHER REFERENCES

Publication: "Hyge Shock Tester," consolidated Electro. Corp. Bulletin 4–70, Rochester, N.Y., February 1957 (73–12), 10 pages.